United States Patent
Pavel

(10) Patent No.: US 10,167,018 B2
(45) Date of Patent: Jan. 1, 2019

(54) AUXILIARY FRAME FOR A VEHICLE AND METHOD FOR PRODUCING AN AUXILIARY FRAME

(71) Applicant: VOLKSWAGEN AG, Wolfsburg (DE)

(72) Inventor: Alexander Pavel, Wolfsburg (DE)

(73) Assignee: Volkswagen AG (DE)

(*) Notice: Subject to any disclaimer, the term of this patent is extended or adjusted under 35 U.S.C. 154(b) by 53 days.

(21) Appl. No.: 15/372,879

(22) Filed: Dec. 8, 2016

(65) Prior Publication Data
US 2017/0166256 A1    Jun. 15, 2017

(30) Foreign Application Priority Data
Dec. 10, 2015 (DE) ............ 10 2015 224 852

(51) Int. Cl.
| | | |
|---|---|---|
| *B62D 21/11* | (2006.01) | |
| *B62D 27/02* | (2006.01) | |
| *B62D 27/06* | (2006.01) | |
| *B62D 65/02* | (2006.01) | |
| *B62D 29/00* | (2006.01) | |

(52) U.S. Cl.
CPC ............ *B62D 21/11* (2013.01); *B62D 27/023* (2013.01); *B62D 27/065* (2013.01); *B62D 65/02* (2013.01); *B60Y 2306/01* (2013.01); *B60Y 2410/124* (2013.01); *B62D 29/007* (2013.01)

(58) Field of Classification Search
CPC .... B62D 21/11; B62D 27/023; B62D 27/065; B62D 65/02; B62D 29/007; B60Y 2410/124; B60Y 2306/01
See application file for complete search history.

(56) References Cited

U.S. PATENT DOCUMENTS

| | | | |
|---|---|---|---|
| 5,573,274 A | 11/1996 | Koketsu | |
| 6,109,654 A * | 8/2000 | Yamamoto | B62D 21/152 180/299 |
| 6,349,953 B1 * | 2/2002 | Yoshihira | B60G 7/02 280/124.109 |
| 6,494,472 B2 * | 12/2002 | Suzuki | B62D 21/11 280/124.109 |
| 6,679,523 B2 * | 1/2004 | Yamamoto | B60G 7/02 180/311 |

(Continued)

FOREIGN PATENT DOCUMENTS

| | | |
|---|---|---|
| DE | 10107960 A1 | 8/2002 |
| DE | 102006049540 A1 | 4/2008 |

(Continued)

OTHER PUBLICATIONS

Search Report from German Patent Application No. 10 2015 224 852.6; dated Jul. 7, 2016.

*Primary Examiner* — Drew J Brown
(74) *Attorney, Agent, or Firm* — Barnes & Thornburg LLP

(57) ABSTRACT

A subframe for a vehicle for supporting at least one wheel-controlling component, wherein the subframe has at least one shell element, wherein the subframe has or forms at least one mount section for the mounting of a transverse link element, wherein a first subsection of the mount section has or forms at least one first passage opening for receiving a fastening mechanism for the transverse link element, wherein a further subsection of the mount section is a section which is bent relative to the first subsection. Also disclosed is a method for producing a subframe.

20 Claims, 6 Drawing Sheets

(56) References Cited

U.S. PATENT DOCUMENTS

| | | | | |
|---|---|---|---|---|
| 8,967,672 | B2* | 3/2015 | Kurogi | B62D 21/11 |
| | | | | 280/788 |
| 9,394,002 | B2* | 7/2016 | Uicker | B23K 20/129 |
| 9,776,660 | B2* | 10/2017 | Imanishi | B62D 21/11 |
| 2013/0241186 | A1* | 9/2013 | Shibaya | B62D 21/11 |
| | | | | 280/781 |
| 2015/0075896 | A1 | 3/2015 | Imanishi et al. | |
| 2016/0152272 | A1* | 6/2016 | Tomikuda | B62D 21/02 |
| | | | | 296/203.01 |
| 2016/0221606 | A1* | 8/2016 | Irle | B62D 21/11 |
| 2017/0066301 | A1* | 3/2017 | Terashima | B60G 21/0551 |
| 2017/0210429 | A1* | 7/2017 | Isakiewitsch | B62D 25/085 |
| 2017/0313354 | A1* | 11/2017 | Kim | B62D 21/11 |

FOREIGN PATENT DOCUMENTS

| | | | |
|---|---|---|---|
| DE | 502005005973 | T2 | 5/2009 |
| DE | 102008055926 | A1 | 8/2009 |
| DE | 102012007325 | A1 | 10/2013 |
| DE | 102013108695 | A1 | 2/2015 |
| DE | 102014112090 | A1 | 2/2016 |
| EP | 2902303 | A1 | 8/2015 |

\* cited by examiner

AUXILIARY FRAME FOR A VEHICLE AND METHOD FOR PRODUCING AN AUXILIARY FRAME

PRIORITY CLAIM

This patent application claims priority to German Patent Application No. 10 2015 224 852.6, filed 10 Dec. 2015, the disclosure of which is incorporated herein by reference in its entirety.

SUMMARY

Illustrative embodiments relate to a subframe for a vehicle for supporting at least one wheel-controlling component and to a method for producing a subframe of the same type.

BRIEF DESCRIPTION OF THE DRAWINGS

The disclosed embodiments will be discussed in more detail with respect to the figures, in which.

DETAILED DESCRIPTION

Figure 1:
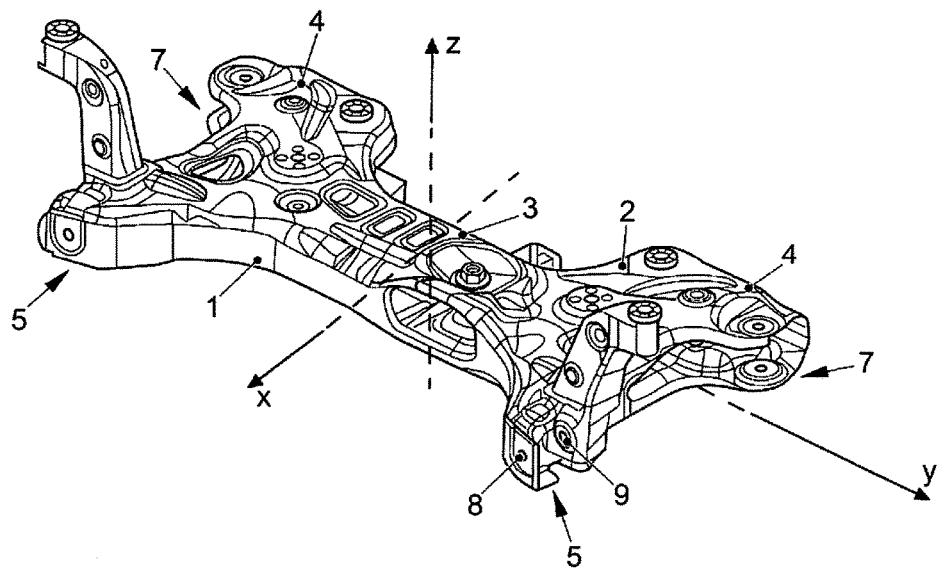
FIG. 1 shows a perspective view of a subframe.

It is known from the prior art that, in vehicles, optionally, motor vehicles, subframes can be utilized for supporting wheel-controlling components, for example, a transverse link element. DE 101 07 960 A1 discloses a subframe for a motor vehicle for supporting wheel-controlling links, which subframe comprises a hollow tube element which extends in a transverse direction of the vehicle. Furthermore, the subframe comprises a shell element which extends in a transverse direction of the vehicle and which is connected to the hollow tube element. Furthermore, mounts for the links are fastened in each case to end sections of the hollow tube element extending in the transverse direction.

It is furthermore desirable to improve the crash safety of a vehicle. It may be desirable to improve the crash safety in the event of a collision with an overlap of 25% of the vehicle width with a rigid obstruction. Such crash scenarios may arise, for example, if the vehicle collides with a tree or with a bollard.

Known solutions comprise the introduction of further stiffening elements in the engine bay and/or of a transverse strut behind an instrument panel of the vehicle. It is also possible for sills and a floor region of a passenger compartment to be additionally stabilized to prevent a vehicle wheel from penetrating into the footwell in the event of a crash.

The technical problem addressed is that of providing a subframe for a vehicle and a method for producing a subframe of the same type, which subframe and method increase a level of crash safety of the vehicle.

It is a basic concept of the disclosed embodiments to increase the level of mechanical stability of a mount section for the mounting of a transverse link element of the vehicle to increase the tear-away force required for the tearing-away of the mounted transverse link element. In this way, an undesirably intense rotation of the wheel in the event of a crash is minimized, whereby, in turn, the risk of undesired damage of the vehicle caused by the rotating wheel is minimized.

A subframe for a vehicle for supporting at least one wheel-controlling component is proposed. The subframe serves for receiving or mounting a transverse link element.

The auxiliary frame may be a formed part, optionally a formed part composed of at least one metal sheet. In the installed state of the subframe, the subframe may extend along an axis oriented parallel to the vehicle transverse axis. The metal sheet may be a steel sheet.

The subframe may be assigned a longitudinal axis, a transverse axis and a vertical axis. In the installed state of the subframe, the longitudinal axis of the subframe may be oriented parallel to the vehicle longitudinal axis. Furthermore, the transverse axis of the subframe may be oriented parallel to the vehicle transverse axis. Furthermore, the vertical axis of the subframe may be oriented parallel to the vehicle vertical axis.

The subframe may, as described in DE 101 07 960 A1, comprise a hollow tube element which extends along the transverse axis of the subframe.

Furthermore, the subframe comprises at least one shell element. The shell element may likewise extend along the transverse direction of the subframe. Furthermore, the at least one shell element may be connected to the hollow tube element. It is conceivable for the subframe to comprise two shell elements, optionally, an upper shell element and a lower shell element. The shell elements may be mechanically connected to one another, optionally, welded to one another. The shell element may be a sheet-metal part.

The subframe, optionally, the shell element or one of the shell elements, may form a trough-shaped depression toward an underside. The trough-shaped depression may extend over the entire extent of the subframe along the transverse axis or along a predetermined fraction, for example, along 90%, of the width along the transverse axis. Furthermore, the subframe may be designed in accordance with one or more aspects as per one or more of the embodiments claimed and described in DE 101 07 960 A1.

The subframe, optionally, the at least one shell element, has or forms at least one mount section for the mounting of a transverse link element. The mount section may be arranged on or in the region of a free end of the subframe along the transverse axis of the subframe. A mount axis which is defined by the mount section may in this case be oriented parallel to the longitudinal axis of the subframe. This is however not imperative. It is, however, optional for the mount axis to be arranged in a plane which is oriented orthogonally with respect to the vertical axis of the subframe.

By way of the mount section, a free end of the transverse link element can be mounted to be pivotable about the mount axis.

According to the disclosed embodiments, a first subsection of the mount section has or forms at least one first passage opening for receiving a fastening means for the transverse link element. The fastening means may be a screw which is passed through the first passage opening for the purpose of the mounting of the transverse link element.

The mount section may furthermore have a further passage opening which is arranged along the longitudinal axis of the subframe so as to be spaced apart from the first passage opening with a predetermined spacing. Furthermore, the mount section may have a fastening nut in the region of the further passage opening. A transverse link element may have, for example, on a free end, a mount sleeve, wherein the mount sleeve is arranged for fastening between the first and further passage opening of the mount section. Furthermore, the transverse link element may have a rubber mount element which is arranged within the mount sleeve. Then, the fastening means can be inserted through the first passage opening, through the mount sleeve and/or through the rubber mount element of the transverse link element and through the further passage opening, and can, for example, be screwed into the fastening nut.

Furthermore, the first subsection may at least partially or entirely have a planar surface, wherein the first passage opening is arranged in the region of the planar surface. The planar surface may form an abutment surface for a screw head.

Furthermore, a further subsection of the mount section is a section which is bent relative to the first subsection. Thus, the mount section is a bent or curved section. The further subsection may in this case be arranged along the transverse axis of the subframe adjacent to the first passage opening. The bent section may be arranged on the free end of the subframe along the transverse axis, or may form the free end.

The bent section may be bent about a bending axis which is oriented parallel to the vertical axis of the subframe. The bent section may in this case also be referred to as an offset section. The term "bent section" does not imperatively mean that the bent section has been produced by bending of the subframe. The bent section may also be produced by other production methods, for example, during the course of a casting process. The bent section is, however, optionally produced by way of corresponding deformation of the subframe, optionally, of the mount section. The bending line may in this case be a straight line.

A minimal bending radius of the bend of the bent section about the bending axis may be equal to the thickness of the single metal sheet.

Through the provision of the bent section, it is achieved that a tear-away force is increased in relation to a mount section without a bent subsection. The tear-away force refers in this case to a force required for tearing the fastening means or the transverse link element away out of the first passage opening.

In a further disclosed embodiment, a bending axis of the bent section is oriented parallel to a vertical axis of the subframe. This means that, in the installed state of the subframe, the bending axis may be oriented parallel to the vertical axis of the vehicle. In this way, it is achieved that the required tear-away force along the transverse axis of the subframe is increased.

In another disclosed embodiment, the mount section has or forms an embossment or a bead. In this way, it is possible for a level of mechanical stability of the mount section to be further increased, whereby, in turn, an increase of the required tear-away force is realized.

In a further disclosed embodiment, the embossment or bead extends from the first subsection to the further subsection. A centerline of the bead or embossment may in this case run in a plane which is oriented orthogonally with respect to the vertical axis of the subframe. The fact that the embossment or bead extends from the first to the further subsection may mean that an initial section of the bead or embossment is arranged in or at an edge region of the first subsection, wherein an end section of the bead or embossment is arranged in or adjacent to an edge region of the bent section.

This yields the maximum possible increase of the mechanical stability of the mount section.

In a further disclosed embodiment, the embossment or the bead is arranged at the same height as the first passage opening along the vertical axis of the subframe. A central centerline of the embossment or bead may be arranged at the same height as a central point of the passage opening. This yields an increase of the mechanical stability in the region adjacent to the passage opening.

In a further disclosed embodiment, a thickness of the mount section is greater in a reinforcement region around the first passage opening than outside the reinforcement region. Geometric dimensions of the reinforcement region can thus be smaller than corresponding geometric dimensions of the mount section. For example, the reinforcement region may be a region formed in the manner of a hollow ring or of a holed disk, wherein a diameter of the inner opening of the region is equal to or greater than the diameter of the first passage opening. A minimal outer diameter of the region is intended to ensure the complete support of the fastening means. For example, the outer diameter may correspond to the sum of support diameter of a screw and the difference between an internal diameter of the reinforcement region and a thread diameter of the screw. This makes it possible for a screw head to be supported on the reinforcement region despite a degree of play. It is however self-evidently also possible for the reinforcement region to have other geometries.

In other words, the mount section is thickened or reinforced around the first passage opening. This yields a further increase of the mechanical stability and thus of the required tear-away force.

In a further disclosed embodiment, the subframe comprises a reinforcement element which is arranged in the reinforcement region and which is connected to the subframe, optionally, to the shell element. The reinforcement element may be a sheet-metal part. This yields a simple mechanical construction of the reinforcement around the first passage opening. The reinforcement element may be a holed disk or a hollow ring.

In a further disclosed embodiment, the reinforcement element is welded to the subframe, optionally, to the at least one shell element. The welding may be realized for example, by way of so-called MAG welding or so-called spot welding. This yields a simple mechanical connection of the reinforcement element to the subframe.

In a further disclosed embodiment, the mount section has a weld seam in a region adjacent to the passage opening. The weld seam may be arranged along the transverse axis adjacent to the passage opening, optionally, toward the free end of the subframe. The spacing between weld seam and central point of the passage opening should be selected such that the support of the fastening means is ensured. Through the provision of a weld seam, a further increase of the mechanical stability of the mount section and an increase of the required tear-away force are realized.

In a further disclosed embodiment, the weld seam extends parallel to the vertical axis of the subframe. In this way, the tear-away force required along the transverse axis of the subframe is increased.

In a further disclosed embodiment, the subframe comprises, as fastening means, a combination ribbed screw. Thus, an arrangement composed of subframe, fastening means and transverse link element is also described, wherein the transverse link element is fastened to the subframe by way of the combination ribbed screw. The combination ribbed screw may extend through the first passage opening, through a mount bushing of the transverse link element and through a further passage opening into a fastening nut of the subframe. In the fasting state, the combination ribbed screw, optionally, the toothed lock washer thereof, can bear against a surface of the mount section. Here, the combination ribbed screw may refer to a flanged screw which has an additional toothed lock washer, wherein the toothed lock washer is arranged below the screw head. The toothed lock washer may form one or more teeth on an underside. In the case of the screw connection of the combination ribbed screw, the toothed underside can dig into the material of the subframe in the region of the mount section. In this way, a force fit and form fit between the combination ribbed screw and subframe can be improved. This, in turn, leads to an increase of the required tear-away force, because an improved mechanical connection between the transverse link element and the subframe is realized by way of the combination ribbed screw.

Also proposed is a method for producing a subframe for a vehicle for supporting at least one wheel-controlling component. By way of the method, a subframe corresponding to at least one of the disclosed embodiments can be produced. A shell element is provided, wherein the subframe, optionally, the shell element, has or forms at least one mount section for the mounting of a transverse link element.

According to the disclosed embodiments, a first subsection of the mount section is provided so as to have at least one first passage opening for receiving a fastening means for the transverse link element. Furthermore, a further subsection of the mount section is provided as a section which is bent relative to the first subsection. The bent section may, but not imperatively, be provided by deformation of the mount section, optionally, about a bending line. The method permits the production of a subframe with the benefits already discussed.

Also proposed is a subframe for a vehicle for supporting at least one wheel-controlling component, wherein the subframe comprises at least one shell element, wherein the subframe, optionally, the shell element, has or forms at least one mount section for the mounting of a transverse link element.

According to the disclosed embodiments, the mount section has or forms at least one first passage opening for receiving a fastening means for the transverse link element. Furthermore, a thickness of the mount section is greater in a reinforcement region around the first passage opening than outside the reinforcement region. The thickness may be measured parallel to the longitudinal axis of the subframe. This and corresponding benefits have already been discussed above.

In a further disclosed embodiment, the subframe comprises a reinforcement element which is arranged in the reinforcement region and which is mechanically connected to the subframe, optionally, to the shell element.

In a further disclosed embodiment, the reinforcement element is welded to the subframe, optionally, to the at least one shell element. This disclosed embodiment and corresponding benefits have already been discussed above.

Also proposed is a method for producing a subframe for a vehicle for supporting at least one wheel-controlling component, wherein a shell element is provided, wherein the subframe, optionally, the shell element, has or forms at least one mount section for the mounting of a transverse link element.

According to the disclosed embodiments, the mount section is provided so as to have at least one first passage opening for receiving a fastening means for the transverse link element, wherein a thickness of the mount section is greater in a reinforcement region around the first passage opening than outside the reinforcement region. The method permits the production of a subframe as per one of the above-described embodiments with the benefits already discussed.

Also proposed is a subframe for a vehicle for supporting at least one wheel-controlling component, wherein the subframe comprises at least one shell element, wherein the subframe has or forms at least one mount section for the mounting of a transverse link element.

According to the disclosed embodiments, the mount section has or forms at least one first passage opening for receiving a fastening means for the transverse link element. Furthermore, the mount section has a weld seam in a region adjacent to the passage opening. This and corresponding benefits have already been discussed above in this case.

In a further disclosed embodiment, the weld seam extends parallel to a vertical axis of the subframe. This and corresponding benefits have likewise been discussed above.

Also proposed is a method for producing a subframe for a vehicle for supporting at least one wheel-controlling component, wherein a shell element is provided, wherein the subframe, optionally, the shell element, has or forms at least one mount section for the mounting of a transverse link element.

According to the disclosed embodiments, the mount section is provided so as to have at least one first passage opening for receiving a fastening means for the transverse link element, wherein a weld seam is arranged adjacent to the first passage opening. The method permits the production of a subframe as per one of the above-discussed embodiments and with the corresponding benefits. The weld seam may be arranged adjacent to the passage opening so as to extend parallel to the vertical axis of the subframe.

Also proposed is a subframe for a vehicle for supporting at least one wheel-controlling component, wherein the subframe comprises at least one shell element, wherein the subframe has or forms at least one mount section for the mounting of a transverse link element.

According to the disclosed embodiments, the mount section has or forms at least one first passage opening for receiving a fastening means for the transverse link element. Furthermore, the subframe comprises, as fastening means, a combination ribbed screw. Thus, an arrangement composed of subframe, fastening means and transverse link element is also described, wherein the transverse link element is fastened to the subframe by way of the combination ribbed screw. This and corresponding benefits have already been discussed above.

Also proposed is a method for producing a subframe for a vehicle for supporting at least one wheel-controlling component, wherein at least one shell element is provided, wherein the at least one shell element has or forms at least one mount section for the mounting of a transverse link element.

According to the disclosed embodiments, the mount section is provided so as to have at least one first passage opening for receiving a fastening means for the transverse link element, wherein the transverse link element is fastened to the subframe by way of a combination ribbed screw which extends through the first passage opening. The method may also comprise the provision of the combination ribbed screw and the fastening of the transverse link element to the subframe by way of the combination ribbed screw. For the fastening, it is possible, as already discussed above, for the combination ribbed screw to be screwed into a fastening nut of the subframe through the first passage opening, through a mount bushing of the transverse link element and through a further passage opening of the subframe.

Below, the same reference designations are used to denote elements with the same or similar technical features.

FIG. 1 shows a perspective view of a subframe 1. The illustration shows a longitudinal axis x of the subframe 1, a transverse axis y of the subframe 1 and a vertical axis z of the subframe 1. In the installed state of the subframe 1, the transverse axis y is oriented parallel to a transverse axis of a vehicle (not illustrated). The longitudinal axis x is oriented parallel to a longitudinal axis of the vehicle. The vertical axis z is oriented parallel to a vertical axis of the vehicle.

The subframe 1 comprises a shell element 2. The shell element 2 is, in this case, a sheet-metal element. The shell element 2 comprises an upper shell (not designated) and a lower shell (likewise not designated) which are mechanically connected, optionally, welded, to one another and which, in the connected state, form the subframe 1. The shell element 2 comprises a central section 3 and end sections 4. The attachment points or elements for steering gear, hinged support, exhaust system and power unit underride guard/aerodynamic paneling are formed in the central section 3.

Figure 7:
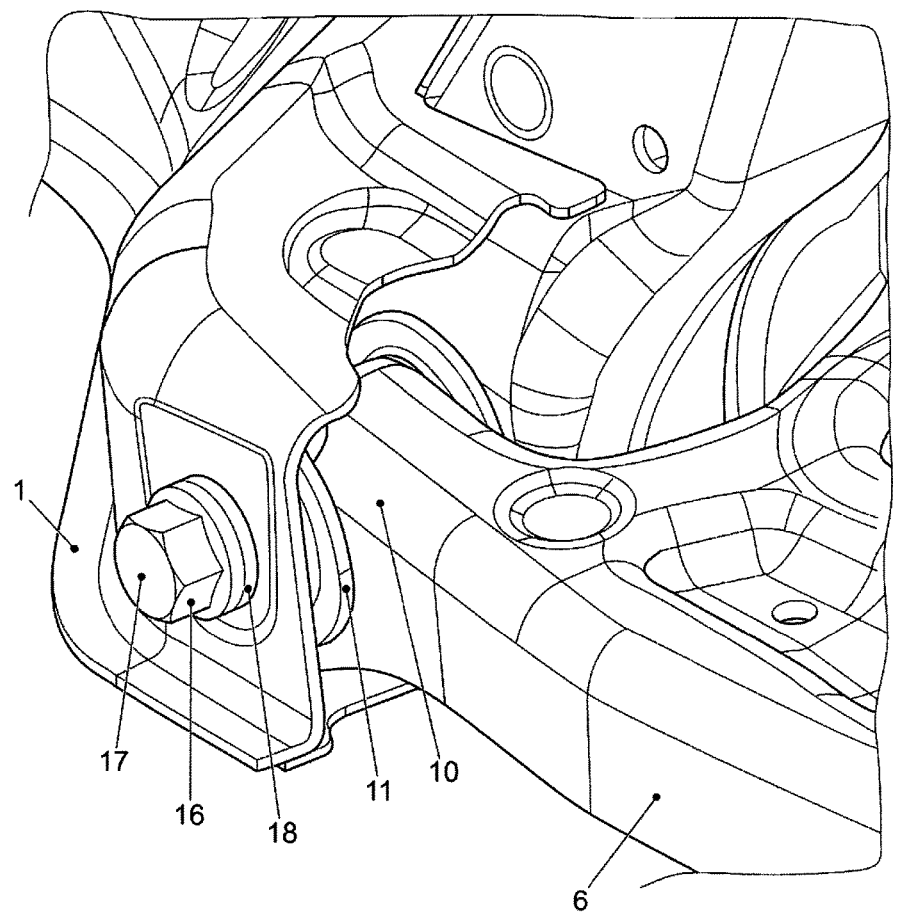
FIG. 7 shows a perspective view of a mount section in a further disclosed embodiment.

The end sections 4 form in each case one first mount section 5 for the mounting of a transverse link 6 (see FIG. 7). The first mount sections 5 are formed along the longitudinal axis x at a front end, and at the outer ends along the transverse axis y, of the subframe 1.

The subframe 1 likewise forms further mount sections 7 for the mounting of the transverse link element 6. The further mount sections are formed along the longitudinal axis x at a rear end and along the transverse axis at outer ends of the subframe 1.

Here, the first mount sections 5 define a mount axis which is arranged in a plane oriented orthogonally with respect to the vertical axis z. The further mount sections 7 in each case define a mount axis which is oriented parallel to the vertical axis z or which is arranged in a plane which is oriented orthogonally with respect to the longitudinal axis x.

In the first mount sections 5, the subframe 1 has in each case one first passage opening 8 and one further passage opening 9 which is spaced apart from the first passage opening 8 along the longitudinal axis x with a predetermined spacing. A fastening nut (not illustrated) is arranged in the region of the further passage opening 9.

For the mechanical connection between the subframe 1 illustrated in FIG. 1 and the transverse link element 6, a mount bushing 10 of the transverse link element 6 is arranged between the first and the further passage opening 8, 9 (see FIG. 7). A hollow cylindrical rubber element 11 may be arranged in the mount bushing 10, which rubber element in turn is arranged around an inner sleeve (not illustrated). On face sides, the rubber element 11 may have projecting sections. The transverse link element 6 may be fastened by way of a fastening means, optionally, a screw, to the subframe 1 by virtue of the screw being passed through the first passage opening, the interior volume of the inner sleeve of the rubber element 11 and through the further passage opening 9 and screwed into the fastening nut.

In the fastened state, the transverse link 6 can be pivoted about the mount axis of the first mount section 5.

Correspondingly, the transverse link element 6 may also be fastened to the subframe 1 in the region of the further mount sections 7.

Figure 2:
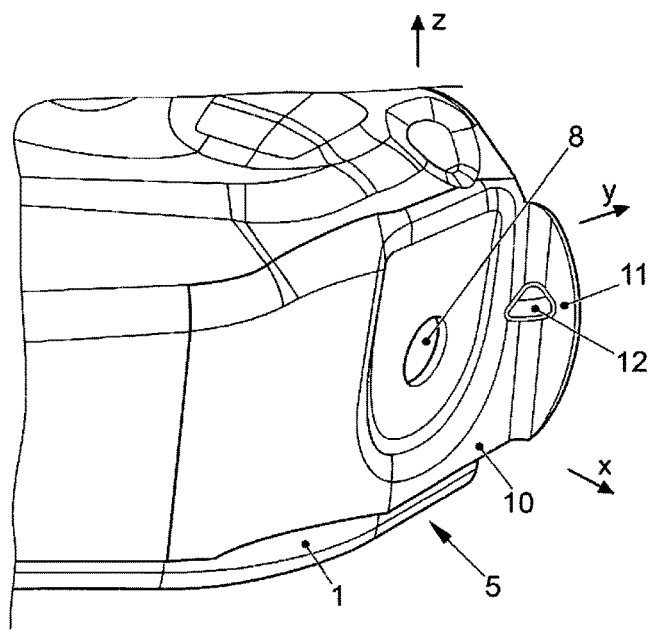
FIG. 2 shows a perspective front view of a mount section.

FIG. 2 shows a perspective front view of a mount section 5 of the subframe 1.

A first subsection 10 of the first mount section 5 has a first passage opening 8. In a region around the first passage opening 8, a surface of the first subsection 10 is of non-curved, that is to say planar, form. The surface may be a front surface of the first subsection 10 along the longitudinal axis x (see FIG. 1), and may also serve as an abutment surface for the fastening means.

Also illustrated is a further subsection 11 of the first mount section 5, wherein the further subsection 11 is a curved section relative to the first subsection 10. The further subsection 11 may be produced by virtue of an outer end section of the first mount section 5 along the transverse axis y being bent about a bending axis, wherein the bending axis is oriented parallel to the vertical axis z of the subframe 1. A bend angle may in this case amount to at least 60°. The bend angle may amount to 90°.

The illustration shows that an edge profile of a front edge of the further subsection 11 along the longitudinal axis x is of circular-segment-shaped form. Thus, a length of the further subsection 11 varies for different heights along a direction parallel to the vertical axis z, wherein the length is measured along the longitudinal axis x.

The illustration also shows that the mount section 5 has an embossment 12. The embossment 12 extends from an outer edge region of the first subsection 10 along the transverse axis y to the further subsection 11. The embossment 12 may, for example, be produced by virtue of the first mount section 5 being impressed, from a rear side, in the region of the bend.

The illustration also shows that the embossment 12 is arranged at the same height along the vertical axis z of the subframe 1 as a central point of the first passage opening 8.

Figure 3:
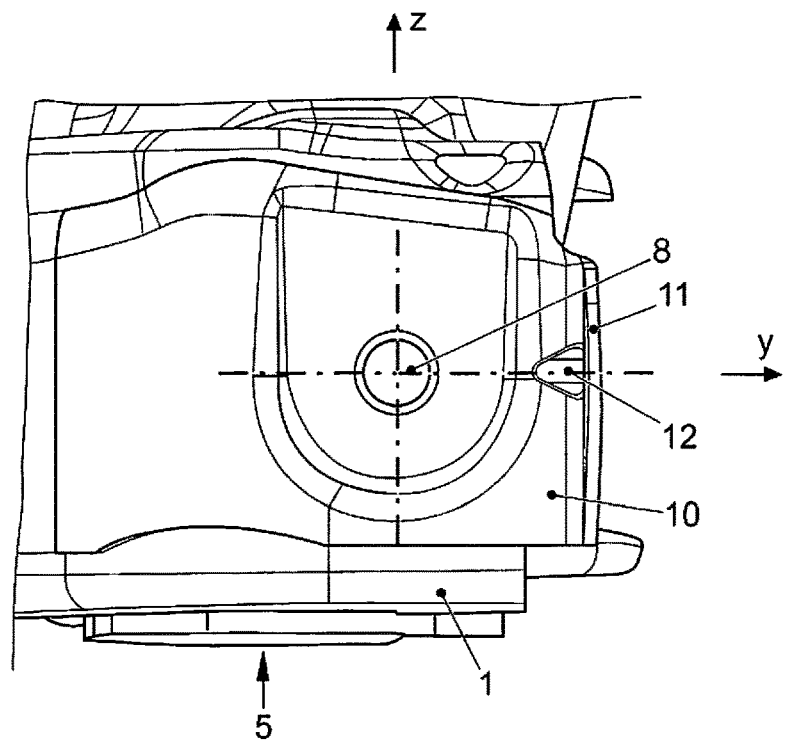
FIG. 3 shows a front view of the mount section illustrated in FIG. 2.

FIG. 3 shows a front view of the first mount section 5 illustrated in FIG. 2. It can be seen that that region of the first mount section 5 which is arranged around the first passage opening 8, optionally, of the first subsection 10 which forms the abutment surface, is formed by way of a depression relative to the surrounding region of the subframe 1.

The illustration also shows that a central centerline of the embossment 12, which extends from the first subsection 10 to the further subsection 11, is arranged parallel to the transverse axis y of the subframe 1.

Figure 4:
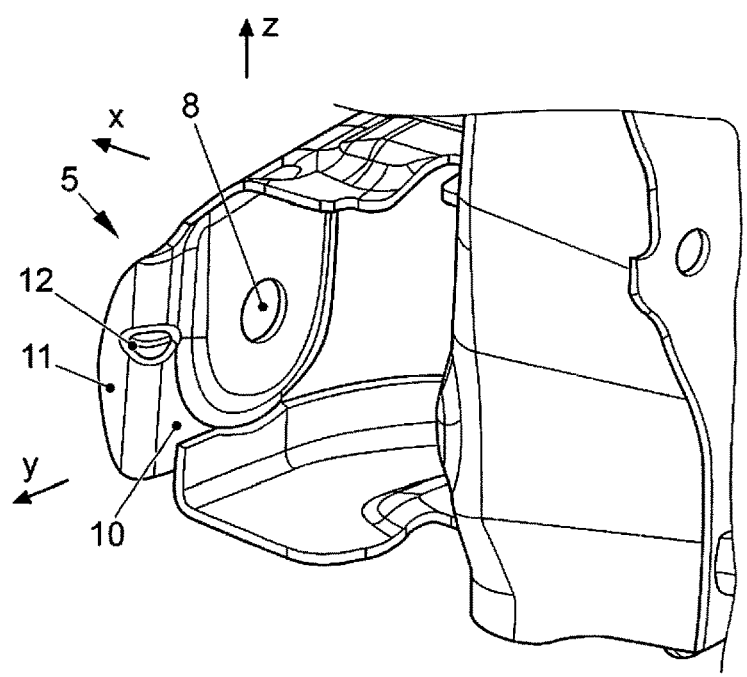
FIG. 4 shows a perspective rear view of the mount section illustrated in FIG. 2.

FIG. 4 illustrates a perspective rear view of the first mount section 5. It can be seen that the embossment 12 is produced by way of a notch in the region of the curved connecting section between the first and further subsections 10, 11.

Figure 5:
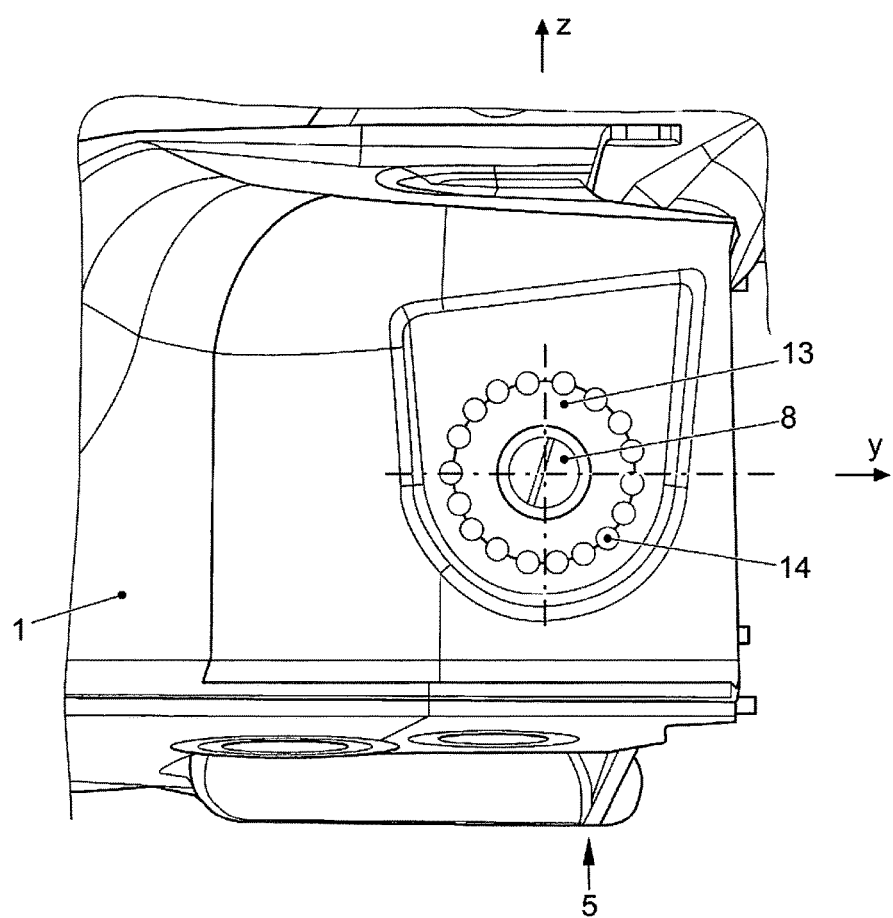
FIG. 5 shows a front view of a mount section in a further disclosed embodiment.

FIG. 5 illustrates a front view of a first mount section 5 of a subframe 1 as per a further disclosed embodiment. In the first mount section 5, a holed disk 13 is arranged in a reinforcement region around the first passage opening 8, wherein a diameter of the hole of the holed disk 13 is equal to or greater than a diameter of the first passage opening 8. Central axes of the first passage opening 8 and of the hole of the holed disk 13 are aligned with one another. The holed disk 13 may in this case be produced from the same material as the subframe 1, optionally, from sheet-metal material. The holed disk 13 is in this case mechanically fastened to a front side of the mount section 5 by way of welding. By way of example, one weld spot 14 is denoted by a reference designation.

In the region in which the holed disk 13 lies on the front side of the first mount section 5, the first mount section 5 is reinforced. The reinforced region may also be referred to as reinforcement region. The reinforcement region may be a subregion of the region with non-curved surface, which subregion has the first passage opening 8 and forms the abutment surface.

Figure 6:
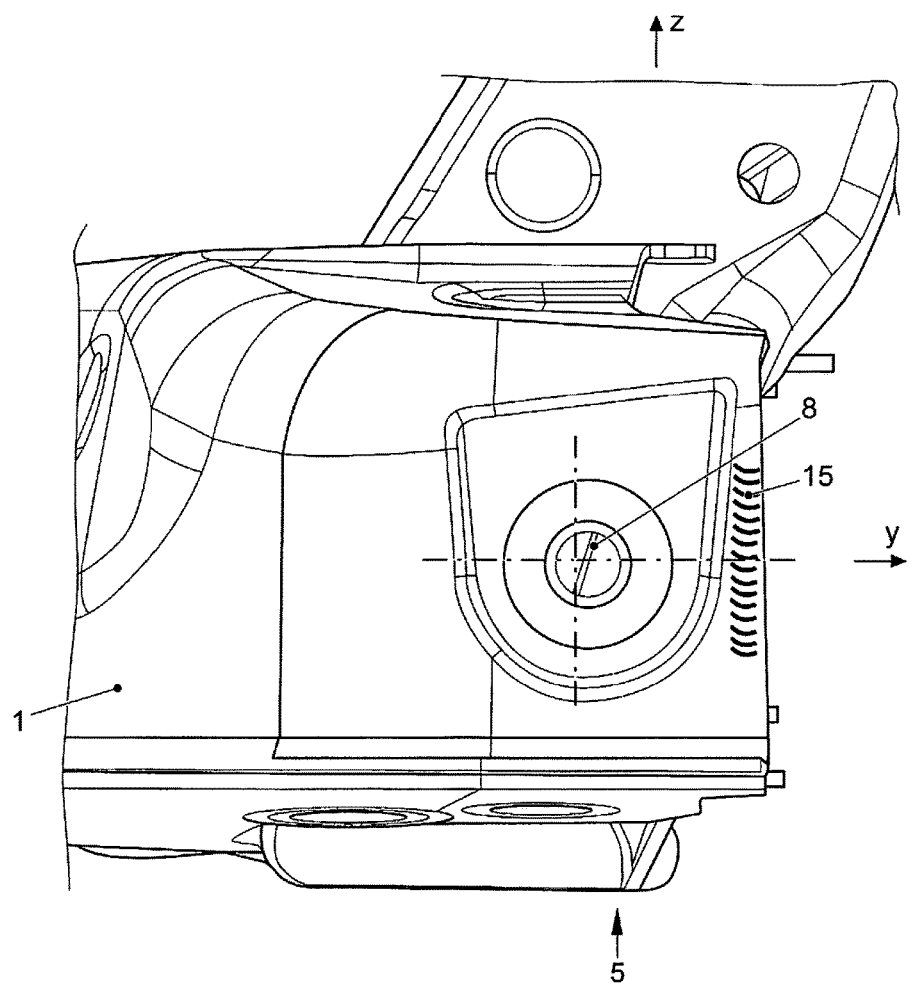
FIG. 6 shows a front view of a mount section in a further disclosed embodiment.

FIG. 6 illustrates a front view of the first mount section 5 of a subframe 1 in a further disclosed embodiment. The illustration shows the first passage opening 8, which is arranged in a region with a planar surface of the first mount section 5. Here, as discussed above, the region forms a depression relative to surrounding sections of the subframe 1. Along a transverse axis y of the subframe 1 adjacent to the first passage opening 8, optionally, adjacent to the depression, the first mount section 5 has a weld seam 15. The weld seam 15 extends parallel to the vertical axis z of the subframe. Furthermore, the weld seam 15 is arranged closer than the first passage opening 8 to a free end of the subframe 1 along the transverse axis y.

FIG. 7 shows a perspective view of a subframe 1 in a further disclosed embodiment. The illustration shows a combination ribbed screw 16, wherein the latter comprises a screw head 17 and a captively retained toothed lock washer 18 which is arranged between the screw head 17 and an externally threaded section (not illustrated) of the combination ribbed screw 16. Also illustrated is a mount bushing 10 of a transverse link element 6 with a rubber element 11 which has an inner sleeve, wherein the rubber element 11 is arranged in the mount bushing 10.

For the fastening of the transverse link element 6 to the subframe 1, the combination ribbed screw 16 is inserted through the first passage opening 8 (see e.g., FIG. 1), through the inner sleeve of the rubber element 11 and through a further passage opening 9 (see FIG. 1) and is screwed into a fastening nut of the subframe 1. During the screwing process, a toothed underside of the toothed lock washer 18 comes into mechanical contact with a region around the first passage opening 8. During the screwing process, teeth on the underside of the toothed lock washer 18 dig into the material of the subframe 1.

Figure 8:
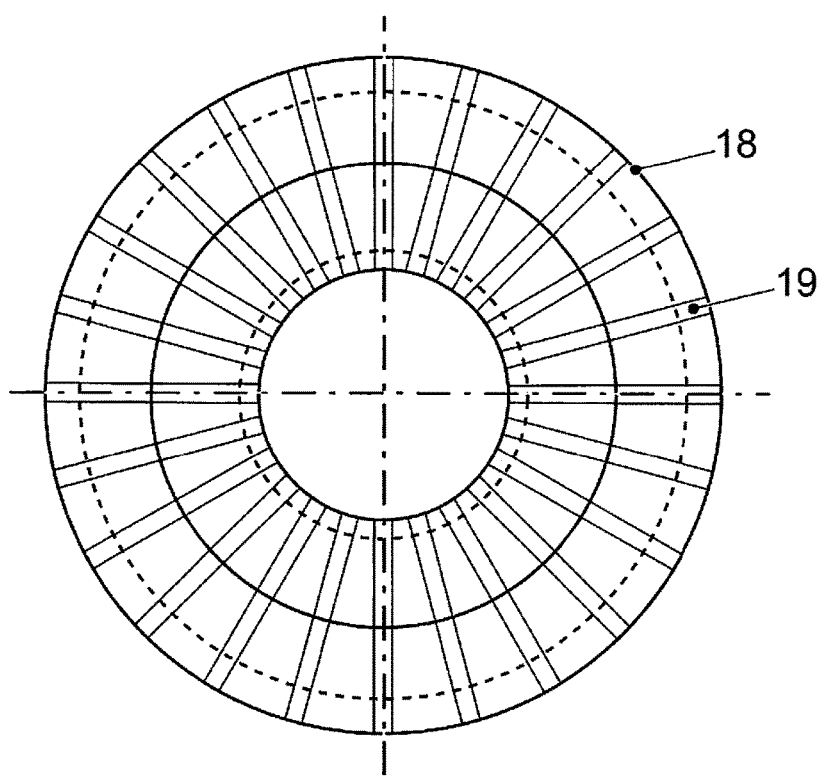
FIG. 8 shows a view of a toothed lock washer from below.

FIG. 8 shows a view of a toothed lock washer 18 from below. Here, it can be seen that, on the underside of the toothed lock washer 18, there are formed teeth 19 which extend along the underside in a radial direction. The teeth may be formed, for example, as elevations.

LIST OF REFERENCE DESIGNATIONS

1 Subframe
2 Shell element
3 Central section
4 End section
5 First mount section
6 Transverse link element
7 Further mount section
8 First passage opening
9 Further passage opening
10 First subsection
11 Further subsection
12 Embossment
13 Holed disk
14 Weld spot
15 Weld seam
16 Combination ribbed screw
17 Screw head
18 Toothed lock washer
19 Tooth
x Longitudinal axis
y Transverse axis
z Vertical axis

The invention claimed is:

1. A subframe for a vehicle for supporting at least one wheel-controlling component, the subframe comprising:
    at least one shell element; and
    at least one mount section for the mounting of a transverse link element,
    wherein a first subsection of the mount section has at least one first passage opening for receiving a fastener for the transverse link element,
    wherein a further subsection of the mount section is bent relative to the first subsection,
    wherein the mount section has an embossment, and
    wherein the embossment is arranged in an end region of the first subsection and in an edge region of the bend section.

2. The subframe of claim 1, wherein a bend axis of the bent section is oriented parallel to a vertical axis of the subframe.

3. The subframe of claim 1, wherein the embossment is arranged at a same height as the first passage opening along the vertical axis of the subframe.

4. The subframe of claim 1, wherein a thickness of the mount section is greater in a reinforcement region around the first passage opening than outside the reinforcement region.

5. The subframe of claim 4, further comprising a reinforcement element arranged in the reinforcement region and mechanically connected to the subframe.

6. The subframe of claim 5, wherein the reinforcement element is welded onto the subframe.

7. The subframe of claim 1, wherein the mount section has a weld seam in a region adjacent to the first passage opening.

8. The subframe of claim 7, wherein the weld seam is parallel to a vertical axis of the subframe.

9. The subframe of claim 1, further comprising, as the fastener, a combination ribbed screw.

10. The subframe of claim 1, wherein a thickness of the mount section is greater in a reinforcement region around the first passage opening than outside the reinforcement region.

11. The subframe of claim 10, further comprising a reinforcement element arranged in the reinforcement region which is mechanically connected to the subframe.

12. The subframe of claim 11, wherein the reinforcement element is welded onto the subframe.

13. The subframe of claim 1, wherein the mount section has a weld seam in a region adjacent to the first passage opening.

14. The subframe of claim 13, wherein the weld seam is parallel to a vertical axis of the subframe.

15. The subframe of claim 1, further comprising, as a fastener, a combination ribbed screw.

16. The subframe of claim 1, wherein the bent further subsection of the mount forms a free end of the mount and is positioned further from a longitudinal axis of the of the shell relative to the first passage opening.

17. A method for producing a subframe for a vehicle for supporting at least one wheel-controlling component, the method comprising:
    providing a shell element and at least one mount section for mounting of a transverse link element,
    wherein a first subsection of the mount section is provided to have at least one first passage opening, having a reinforcement element comprising a weld seam arranged adjacent to the passage opening, for receiving a fastener for the transverse link element, and wherein a further subsection of the mount section is provided as a section which is bent relative to the first subsection.

18. The method of claim 17, wherein a thickness of the mount section is greater in a reinforcement region around the first passage opening than outside the reinforcement region.

19. The method of claim 17, wherein the transverse link element is fastened to the subframe by a combination ribbed screw extending through the first passage opening.

20. The method of claim 17, wherein the bent further subsection of the mount section forms a free end of the section mount and is positioned further from a longitudinal axis of the of the shell relative to the first passage opening.

* * * * *